(12) United States Patent
Manfredotti et al.

(10) Patent No.: US 8,297,928 B2
(45) Date of Patent: Oct. 30, 2012

(54) BLADE FOR REDUCING THE DRAG MOVEMENTS OF SAID BLADE, AND A METHOD OF REDUCING SUCH A DRAG MOVEMENT

(75) Inventors: Thomas Manfredotti, La Colle sur Loup (FR); Paul Cranga, Marseilles (FR); Julien Guitton, Chateauneuf-les-Martigues (FR)

(73) Assignee: Eurocopter, Marignane Cedex (FR)

( * ) Notice: Subject to any disclaimer, the term of this patent is extended or adjusted under 35 U.S.C. 154(b) by 604 days.

(21) Appl. No.: 12/490,798

(22) Filed: Jun. 24, 2009

(65) Prior Publication Data

US 2009/0324406 A1 Dec. 31, 2009

(30) Foreign Application Priority Data

Jun. 27, 2008 (FR) ..................................... 08 03618

(51) Int. Cl.
 *B64C 27/51* (2006.01)
(52) U.S. Cl. ........................................ 416/145; 416/500
(58) Field of Classification Search .................. 416/144, 416/145, 146 R, 500
 See application file for complete search history.

(56) References Cited

U.S. PATENT DOCUMENTS

| | | | |
|---|---|---|---|
| 2,048,326 A | | 7/1936 | Dyer et al. |
| 2,947,365 A | * | 8/1960 | Lightfoot ....................... 416/114 |
| 4,008,980 A | * | 2/1977 | Noehren et al. ........... 416/134 A |
| 4,088,042 A | * | 5/1978 | Desjardins et al. ........... 74/574.3 |
| 4,430,044 A | * | 2/1984 | Liljegren ....................... 416/119 |
| 4,915,585 A | * | 4/1990 | Guimbal ....................... 416/140 |
| 6,119,834 A | * | 9/2000 | Lee ................................. 188/378 |
| 6,827,551 B1 | * | 12/2004 | Duffy et al. ................... 415/119 |
| 7,470,114 B2 | * | 12/2008 | Bonnet ......................... 416/226 |
| 8,029,240 B2 | * | 10/2011 | Cawthorne et al. ....... 416/134 A |
| 2008/0159862 A1 | * | 7/2008 | Beroul ........................... 416/140 |

FOREIGN PATENT DOCUMENTS

| | | | |
|---|---|---|---|
| DE | 3514631 | * | 5/1986 |
| DE | 102 02 995 | | 8/2003 |
| DE | 10 2006 030 167 | | 1/2008 |
| EP | 0 792 414 | | 11/2000 |
| EP | 1 101 034 | | 6/2005 |

(Continued)

OTHER PUBLICATIONS

Device for Balancing a Rotor Blade, Messerschmitt, May 7, 1986, DE 3514631 abstract.*

(Continued)

*Primary Examiner* — Edward Look
*Assistant Examiner* — Liam McDowell
(74) *Attorney, Agent, or Firm* — Brooks Kushman P.C.

(57) ABSTRACT

A blade (10) extending longitudinally from a root (11) of the blade (10) to a free end (12) of the blade (10), the blade (10) having a resonator (13) incorporated therein to reduce the drag movements (F1, F2) of the blade (10), the resonator (13) being provided with a solid and movable heavy element (30) and with resilient retaining element (20) secured to the heavy element (30) and to the blade (10). Furthermore, the resonator (13) includes guide element (40) in which the heavy element (30) is capable of oscillating (F1', F2') longitudinally, the guide element (40) being arranged in a longitudinal direction (D1) of the blade.

19 Claims, 1 Drawing Sheet

FOREIGN PATENT DOCUMENTS

| | | |
|---|---|---|
| EP | 1 754 886 | 2/2007 |
| FR | 791 701 | 12/1935 |
| FR | 2 497 073 | 7/1982 |
| FR | 2 630 703 | 11/1989 |
| WO | 95/21327 | 8/1995 |
| WO | 00/06898 | 2/2000 |

OTHER PUBLICATIONS

Understanding and Using Dynamic Stiffness—A Tutorial (pp. 44-54), Orbit 2000.*

French Search Report dated Mar. 11, 2009., from corresponding French application.

* cited by examiner

BLADE FOR REDUCING THE DRAG MOVEMENTS OF SAID BLADE, AND A METHOD OF REDUCING SUCH A DRAG MOVEMENT

FIELD OF THE INVENTION

The present invention relates to a blade provided with an incorporated resonator for reducing the drag movements of the blade, and it also relates to the method implemented by such a blade, more particularly a blade for a main lift and propulsion rotor of a rotorcraft, in particular a helicopter.

The technical field of the invention is that of means for damping drag movements of a blade.

BACKGROUND OF THE INVENTION

In general, rotorcraft rotors comprise a hub that is driven in rotation about an axis of rotation by an outlet shaft from a power transmission gearbox, referred to as the drive shaft, together with at least two blades that are fastened to the hub via suitable hinges, in particular via a respective laminated spherical thrust-bearing dedicated to each blade, together with inter-blade dampers, each interconnecting two adjacent blades, or dampers connecting each blade to the hub.

Assuming that each blade is engaged in a hub so as to be restrained in bending, the rotor constituted in this way is a rigid rotor. When hovering, the distribution of aerodynamic forces along a blade gives rise to a distribution of bending moments in flapping and in drag, which bending moments are of values that are very large at the root of the blade because of the increase in the circumferential speed proportional to the radius of the rotor.

Furthermore, when flying in translation, the so-called "advancing" blade generates more lift than the so-called "retreating" blade because of the difference in their air speeds, as described in greater detail below.

Consequently, the resultant of the aerodynamic forces exerted on a blade does not have the same value at each azimuth position, nor do the resultants have the same points of application: the restrained bending moment of the root of the blade is thus high and varying, thereby giving rise to alternating stresses that give rise to a fatigue phenomenon that is harmful to materials. In addition, the resultant of the aerodynamic forces of all of the blades is no longer directed along the axis of the rotor, thereby creating a roll moment, that increases with speed and that can make it difficult to balance forces when flying in translation.

In order to remedy those drawbacks, it is known to hinge the blades to the rotor about respective axes perpendicular to the drive shaft and referred to as axes for vertical flapping, corresponding to hinges for vertical flapping capable of transferring a force of arbitrary orientation but not capable under any circumstances of transferring a moment. Consequently, if a blade is hinged to flap relative to the hub, its bending moment in flapping at its point of attachment is zero. To enable the blade to be balanced, the centrifugal forces hold the blade in position after it has moved up a certain amount, thereby producing a cone of angle $a_0$.

Under such conditions, there is firstly no longer any major roll moment when flying in translation, and secondly the rotating blades no longer describe a plane, but rather their outer ends describe a very flat cone. In practice, the flapping axis no longer lies on the axis of rotation, but is offset therefrom by a distance a, referred to as its eccentricity.

It should also be recalled that in order to provide a helicopter with lift in its various configurations, it is necessary to be able to control the lift of the rotor and to vary it. That is why a pitch hinge is provided, of axis that is substantially parallel to the span of the corresponding blade. This new degree of freedom enables the lift of the blade to be controlled by acting on the general pitch control, and also enables pitch to be varied cyclically, thereby enabling the plane of rotation of the blades to be controlled so that they describe a cone of geometrical axis that no longer coincides with the drive axis: the resultant of the forces applied to the hub changes direction together with the plane of the rotor. Because of this, moments are generated about the center of gravity of the helicopter, thereby enabling it to be piloted.

As mentioned above, the plane of rotation of the blades may be other than a plane perpendicular to the drive shaft. Under such conditions, it is necessary for each blade to be hinged to pivot in drag since the end of each blade is at a variable distance from the rotor shaft. Otherwise, inertia forces would necessarily appear, thereby generating reciprocating bending movements on each blade in its own plane. Such a drag hinge allows the blade to pivot about a drag axis that is substantially parallel to the rotor axis, and consequently substantially perpendicular to the drag forces. To enable such a blade to be driven by the drive shaft, it is naturally necessary for the drag hinge to be far enough away from the rotor axis for the moment due to centrifugal forces to balance the moment due to drag and inertia forces, thereby requiring the drag axis to be offset or eccentric by an amount e, and this must be achieved without the so-called "drag" angle $\delta$ being too great.

Consequently, the blades of a hinged rotor for a rotary wing aircraft, in particular a helicopter, can be subjected to the following four kinds of movement:

i) rotation about the rotor axis;

ii) pivoting about the axis for vertical flapping, made possible by the vertical flapping hinge;

iii) pivoting about the drag axis, also known as the axis for horizontal flapping, made possible by the horizontal flapping hinge or drag hinge; and iv) pivoting about the pitch axis of the blade, made possible by a pitch hinge (not specific to hinged rotors).

By way of example, provision is made in patent FR 2 497 073 for the three above-described pivoting movements II, III, and IV to be made possible by a single member such as a laminated spherical thrust-bearing.

Nevertheless, the oscillations of each blade about its drag axis can become coupled in unstable manner with the movements of the airframe or with its elastic deformation modes, in particular with oscillations of a helicopter that is standing on the ground on its landing gear: this is the origin of the so-called "ground resonance" phenomenon that can be dangerous for the rotorcraft when the resonant frequency of the oscillations of the blades about their drag axes and expressed relative to the frame of reference of the rotorcraft is close to one of the resonant frequencies of oscillation of the rotorcraft.

Document FR 791 701 discloses an inertial resonator carried by a rotor blade for damping or contributing to damping the vibration or the oscillation of said blade.

That inertial resonator comprises one or more heavy elements capable of performing transverse movements relative to the longitudinal axis of the blade.

Thereafter, a "box" is fastened to the rib of the blade. Since the rib of the blade extends along the longitudinal axis thereof, the box is arranged transversely to said rib.

At least one heavy element is then placed in the box, with the box acting as guide means therefor when it moves transversely.

According to that document FR 791 701, it is appropriate to move a heavy element transversely in order to solve the problem posed.

Document FR 791 701 explains that if the blade performs a drag movement, the weight moves in the direction opposite to the direction in which the blade moves, thereby contributing to damping the movement of the blade, the movement of the heavy element being retarded relative to the movement of the blade, because of its inertia.

Similarly, although the field of wind turbine blades is remote from the invention insofar as the phenomenon of ground resonance does not appear as such, documents DE 10 202 995 and EP 0 792 414 envisage inertial resonators making use of the transverse shifting of a heavy element in a direction perpendicular to a longitudinal direction of the blade, said longitudinal direction passing via the root of the blade and its end, and being substantially parallel to the axis for blade pitch variation, or indeed coinciding with said pitch variation axis.

Finally, on the same lines, document EP 1 101 034 provides for a wind turbine blade provided with an O-shaped cavity within which a liquid moves in the direction of oscillations, and thus transversely relative to the blade.

Although they are effective, those various resonators providing for a heavy element to move transversely provide damping that is limited, and therefore they do not give complete satisfaction.

Consequently, rotorcraft manufacturers generally make use of a different solution. Such manufacturers remedy the above-mentioned phenomenon of "ground resonance" by introducing on the drag axes damping by means of a resonator having a dry or viscous type damper, or indeed by introducing stiffness with the help of blade-spacing cables optionally associated with dampers, as for the Alouette helicopter made by the Applicant.

A function analogous to that of blade-spacing cables is provided by resilient inter-blade connections. In practice, this amounts to placing a damper between pairs of adjacent blades, the fastenings for such a damper to each of the two adjacent blades being at equal distance from the center of the rotor, i.e. on an identical radius from said rotor center.

Such inter-blade drag dampers include resilient return means of determined stiffness and damping for combating resonance phenomena, in particular ground resonance and also drive system resonance that can also appear, particularly on helicopters.

Patents FR 2 630 703 and U.S. Pat. No. 4,915,585 describe a rotor in which each blade is fastened to the hub by a sleeve having ends in the form of forks each comprising two spaced-apart and facing tines, with an inter-blade drag damper being fastened to two adjacent blades via two respective ball-joints.

Although effective, an arrangement of inter-blade drag dampers presents drawbacks.

Firstly, the weight of each inter-blade damper commonly lies in the range six to eleven kilograms, and that is not negligible.

Secondly, the hub of the rotor needs to be dimensioned so as to receive the inter-blade dampers, thereby increasing the weight of the hub.

Finally, it should be observed that inter-blade dampers work most of the time in part under the effect of dynamic movements of the blades and they increase the drag of the rotor.

OBJECT AND SUMMARY OF THE INVENTION

A particular object of the present invention is to propose a lift blade, preferably for a rotorcraft, that is provided with a resonator that enables the drag movement of the blade to be damped so as to avoid the appearance of a "ground resonance" phenomenon, in particular.

According to the invention, a blade extending longitudinally from a root of the blade to a free end of the blade is provided with an incorporated resonator, i.e. a resonator that is incorporated within the blade, for the purpose of reducing drag movements of said blade when the blade rotates about an axis of rotation such as the mast of a rotorcraft rotor, for example. The resonator is thus provided with a solid and movable heavy element associated with resilient retaining means secured to said heavy element and to the blade.

The blade, e.g. a rotorcraft blade, is remarkable in that said resonator includes guide means in which the heavy element is capable of oscillating longitudinally, the guide means being arranged in a longitudinal direction.

The longitudinal direction along which the heavy element is free to move is substantially parallel to the pitch variation axis of the blade, or indeed coincides with said pitch variation axis. Consequently, the longitudinal direction extends along the span of the blade.

Contrary to existing prejudices, the invention seeks to arrange a solid heavy element in a blade in such a manner as to leave said solid heavy element free to move in a longitudinal direction of the blade and not in a transverse direction perpendicular to the pitch variation axis of the blade.

Surprisingly, the resonator is then capable of combating effectively the drag movements of the blade when the blade is driven in rotation about an axis of rotation, this being achieved by the resonator generating secondary Coriolis forces.

The static stiffness of the resilient retaining means serves to maintain the heavy element in an equilibrium position in the guide means when the blade is driven in rotation by a rotor hub secured to the blade root. It should be observed that the static stiffness of the resilient retaining means needs to be sufficient to keep the heavy element in its equilibrium position and to prevent it from reaching an abutment under the effect of inertia.

Nevertheless, when the blade begins to perform drag movements, the heavy element moves radially relative to the trajectory described by the blade under the effect of primary Coriolis forces, and thus moves longitudinally relative to the blade.

If the drag movement tends to advance the blade in a direction from its mean position, i.e. move the blade forwards relative to the direction of rotation of the rotor fitted with said blade, then the heavy element tends to move away from the axis of that rotation so as to come closer to the free end of the blade. This results in secondary Coriolis forces being created that act perpendicularly to the direction of drag movement of the blade and thus in a direction that is opposite to the direction of rotation of the rotor.

More precisely, while the blade is advancing, i.e. while it is being subjected to an increase in its speed relative to the incident air flow, the blade moves upwards. As a result, all the elements of the blade move closer to the axis of rotation of the rotor and the circumferential speed of the blade on its trajectory should decrease. However, by the inertial effect, the primary Coriolis forces keep constant both the speed of the free end of the blade and the angular momentum of the blade.

These primary Coriolis forces that give rise to the drag movement of the blade are due to the Coriolis acceleration that results from the relative upward speed of the blade associated with the angular speed of rotation with which the rotor is driven.

Each element of the blade is thus subjected to an increase of speed in the direction of rotation of the rotor, thereby increasing centrifugal force and moving the heavy element towards.

Thus, the center of gravity of the blade also moves outwards thereby tending to lower the blade by the effect of gravity and simultaneously oppose said increase in speed of any element of the blade. The drag movement is thus reduced in this direction of rotation.

More precisely, this downward relative speed of the blade associated with the angular speed of rotation with which the rotor is driven gives rise to secondary Coriolis forces opposing the primary Coriolis forces, thereby opposing the drag movement of the blade.

Consequently, in the absence of the invention, the blade would be subjected solely to primary Coriolis forces tending to drive it through a drag movement of large amplitude.

In contrast, the invention makes it possible to generate secondary Coriolis forces opposing said primary Coriolis forces, thereby making it possible to limit or even eliminate the drag movement of the blade.

Similarly, if the drag movement tends to retard the blade from its mean position, i.e. move the blade rearwards relative to the direction of rotation of the rotor, then the heavy element tends to come closer to the drag axis so as to come closer to the root of the blade. This results in secondary Coriolis forces being created that act in the direction of rotation of the rotor.

In surprising and innovative manner, the resonator does not provide for the heavy element to move along the axis of drag movement of the blade, independently of its direction, but on the contrary to move along a longitudinal axis that is substantially perpendicular to said movement in drag of the blade.

In addition, the invention may include one or more of the following additional characteristics.

The resilient retaining means have static stiffness that is high and dynamic stiffness that is low.

This characteristic appears anomalous and contradictory, which means that it cannot be discovered simply by testing. Nevertheless, it serves to optimize the operation of the resonator.

The high static stiffness of the resonator guarantees that the heavy element will not come into abutment against the end of the guide means close to the free end of the blade.

In contrast, the low dynamic stiffness allows the heavy element to be shifted in the required manner about its equilibrium position.

In a first embodiment, the resilient retaining means comprise a spring.

More precisely, in a first variant of the first embodiment, the resilient retaining means constitute a spring that elongates linearly.

In contrast, in a second variant of the first embodiment, the resilient retaining means comprise a torsion spring.

In a second embodiment, the resilient retaining means include a material forming part of the elastomer group.

Furthermore, whatever the embodiment, it is advantageous for the static stiffness of the resonator to be equal to twice the product of the mass of the resonator multiplied by the angular frequency of the first drag mode of the blade raised to the power two so that the first mode of vibration of the resonator is as close as possible to the first resonant mode of the blade in drag motion.

Thus, the static stiffness of the resonator can be obtained from the following intermediate relationship:

$$K_a = 2 \times m_a \times \omega_a^2$$

where:
  × represents the multiplication sign;
  $K_a$ represents the static stiffness of the resonator;
  $m_a$ represents the mass of the resonator; and
  $\omega_a$ represents the angular frequency of the first drag mode of the blade.

Under such conditions, the dynamic stiffness is obtained from the following equation where $K'_a$ represents said dynamic stiffness:

$$K'_a = K_a - m_a \times \omega_a^2$$

In addition, the resonator may include a laminated bearing surrounding the heavy element, the laminated bearing comprising superposed metal material and elastomer material.

By using a laminated bearing in contact with the guide means, it is possible to optimize the static and dynamic stiffnesses of the resonator.

Finally, the guide means are optionally in the form of a tube embedded in the blade, said heavy element being arranged inside the tube.

Consequently, a first end of the resilient retaining means is fastened to an end wall of the tube, while a second end of the resilient retaining means is fastened to the heavy element.

The present invention also provides a method suitable for being implemented in the blade of the invention.

Thus, a method of reducing the drag movements of a blade that extends longitudinally from the root of the blade to a free end of the blade is remarkable in that a solid heavy element is shifted along a longitudinal direction of the blade so as to create secondary Coriolis forces that oppose the drag movement of the blade.

Furthermore, with said blade being connected via a drag hinge to the hub of a rotor, e.g. a rotorcraft rotor, the static stiffness of the heavy element is advantageously determined with the help of the following final relationship:

$$K_a = \frac{2 \times e \times m_a \times \Omega^2 \times (M_s + m_a \times r_a)}{I_\delta + m_a \times r_a^2}$$

where:
  × represents the multiplication sign;
  $K_a$ represents the static stiffness of the resonator;
  $m_a$ represents the mass of the resonator;
  $\Omega$ represents the speed of rotation of the rotor and nominal speed in radians per second;
  e represents the eccentricity, i.e. a first distance between the drag hinge of the blade and the axis of rotation of the rotor;
  $r_a$ represents a second distance between said drag hinge and the center of gravity of the heavy element;
  $M_s$ represents the static moment of the blade; and
  $I_\delta$ represents the drag inertia of the blade.

BRIEF DESCRIPTION OF THE DRAWINGS

The invention and its advantages appear in greater detail in the context of the following description of embodiments given by way of illustration and with reference to the accompanying figures, in which.

Elements shown in more than one of the figures are given the same references in each of them.

MORE DETAILED DESCRIPTION

Figure 1:
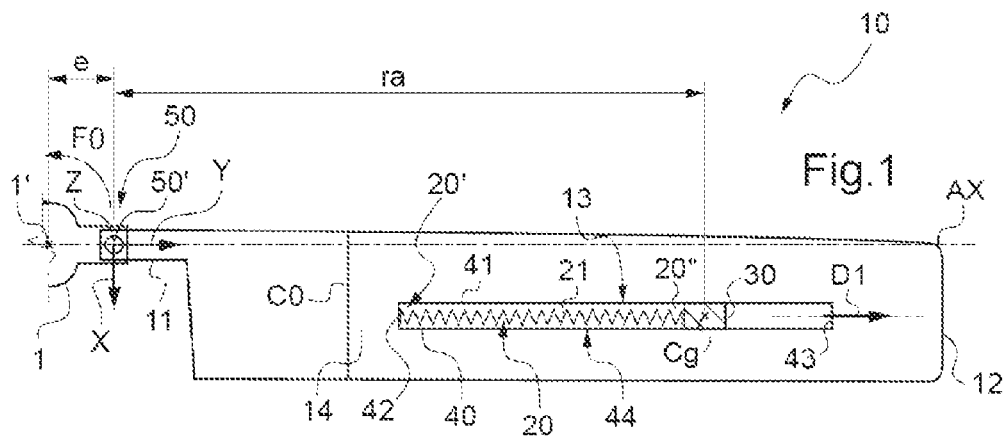
FIGS. 1 and 2 are diagrammatic sections of a blade provided with a resonator constituting a first variant of a first embodiment.
Figure 2:
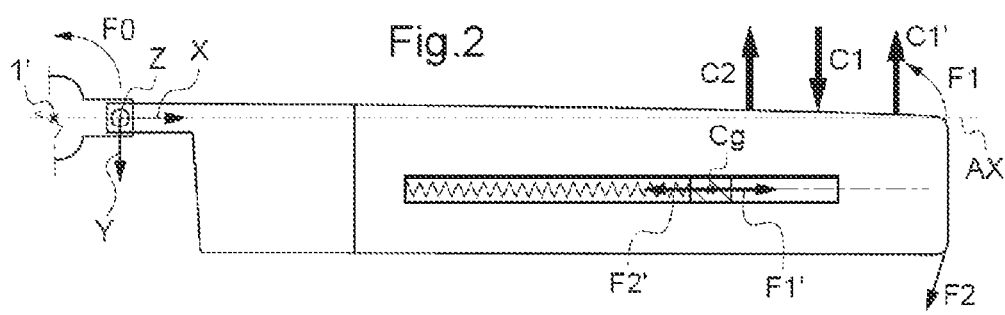

It should be observed that three mutually orthogonal directions X, Y, and Z are shown in FIGS. 1 and 2. These three directions define the frame of reference of the blade shown.

The direction X is said to be "transverse" insofar as it extends perpendicularly to the pitch variation axis AX of the blade 10. The term "transverse" relates to a direction that is parallel thereto.

Another direction Y is said to be longitudinal. The term "longitudinal" relates to a direction that is parallel thereto.

Finally, a third direction Z referred to as elevation corresponds to the height dimensions of the structures described.

FIG. 1 is a diagrammatic section view of a blade 10 extending from the root 11 of the blade to its free end 12. The blade 10 is fastened to the hub 1 of a rotorcraft rotor by a drag hinge 50, the root 11 of the blade being connected to the drag hinge 50 by the usual means.

When the rotorcraft rotor is set into rotation, the blade 10 performs rotary movement around the axis of rotation 1' of the rotor.

In addition, the blade 10 pivots about the drag axis 50'. This drag movement of the blade 10 can then give rise to situations that are catastrophic when the resonant frequency of the oscillation of each blade about its drag axis is close to one of the resonant frequencies of oscillation of the rotorcraft about its landing gear, in particular when standing on its landing gear.

To avoid this problem, the blade 10 is fitted with a resonator 13 incorporated inside the blade 10. Consequently, provision may be made for a hatch in the suction side of the blade 10 to give access to the resonator, e.g. so as to perform maintenance actions.

The resonator 13 comprises guide means 40 disposed inside the blade 10. More precisely, the guide means 40 shown in FIG. 1 consist in a tube 41 arranged in a longitudinal direction D1 parallel to the pitch variation axis AX of the blade 10. The guide means comprise a first end zone 42, a middle zone 44, and a second end zone 43 in succession, going from the root 11 of the blade to the free end 12 of the blade 10.

The guide means 40 are consequently directed along the span of the blade 10 and not along a chord CO of the blade 10.

Furthermore, the resonator 13 includes a weighted element 30 that is solid, such as a cylinder, together with resilient retaining means 20.

The first end 20' of the resilient retaining means 20 is stationary relative to the blade 10, being secured to a filler element 14 of the blade 10 or to the first end zone 42 of the guide means 40, for example.

In contrast, the second end 20" of the resilient retaining means is secured to the weighted element 30.

The weighted element 30 then co-operates with the guide means 40 and the resilient retaining means 20.

With the resilient retaining means 20 and the weighted element 30 installed within the guide means 40, the guide means 40 co-operate with the weighted element 30 so that the heavy element can move solely along the longitudinal direction D1.

With the weighted element 30 arranged inside the tube 41, the weighted element 30 can thus move only in the longitudinal direction D1 along which the guide means 40 extend.

With reference to FIG. 1, and independently of the embodiment selected, when the blade 10 is driven to rotate in the direction of arrow F0, the weighted element 30 shifts so as to reach an equilibrium position.

However, with reference to FIG. 2, if the blade 10 performs a drag movement under the effect of primary drag forces C1' along arrow F1 about the drag axis 50', and thus advances, performing relative movement in the same direction as the blade 10 rotating about the axis of rotation 1', then the heavy element will move closer to the free end 12 of the blade 10, as represented by arrow F1'.

The change in the position of the weighted element 30 generates secondary Coriolis forces C1 that oppose the drag movement of the blade 10, thereby limiting its amplitude.

Conversely, if the blade 10 performs drag movement as represented by arrow F2 about the drag axis 50', and thus retards, performing relative movement in the direction opposite to the direction of the blade 10 rotating about the axis of rotation 1', then the heavy element will move away from the free end 12 of the blade 10 as represented by arrow F2', thereby generating secondary Coriolis forces C2. These secondary Coriolis forces C2 oppose the drag movement of the blade 10.

Thus, the heavy element shifts constantly, but solely along the longitudinal direction D1, oscillating about its equilibrium position.

According to the invention, it is thus the heavy element that is shifted along a longitudinal direction of the blade in order to generate secondary Coriolis forces that oppose the drag movement of the blade.

In order to be optimized, the resilient retaining means 20 needs to have a high level of static stiffness, making it possible to avoid exceeding the length of the main portion of the blade so as to be able to combat the inertia forces generated by the blade rotating about the axis of rotation 1' of the rotor.

Consequently, the equilibrium position of the weighted element 30 is indeed situated in a middle zone 44 of the guide means 40 and not against the second end zone 43 of the guide means 40, i.e. the zone of the guide means 40 that is closest to the free end 12 of the blade 10.

This characteristic makes it possible to guarantee that the heavy element oscillates between first and second extreme positions, the first extreme position lying between the root 11 of the blade and the equilibrium position, while the second extreme position lies between the equilibrium position and the free end of the blade 10.

More precisely, the static stiffness of the resonator may be equal to twice the product of the mass of the resonator multiplied by the angular frequency of the first drag mode of the blade raised to the power two so that the first mode of vibration of the resonator is as close as possible to the first resonant mode in drag of the blade.

The static stiffness of the resonator is then derived from the following intermediate relationship:

$$K_a = 2 \times m_a \times \omega_a^2$$

where:

× represents the multiplication sign;

$K_a$ represents the static stiffness of the resonator;

$m_a$ represents the mass of the resonator; and $\omega_a$ represents the angular frequency of the first drag mode of the blade.

Taking account of the additional mass of the resonator in order to obtain the angular frequency of the first drag mode of the blade, the following final relationship is obtained:

$$K_a = \frac{2 \times e \times m_a \times \Omega^2 \times (M_s + m_a \times r_a)}{I_\delta + m_a \times r_a^2}$$

where:
× represents the multiplication sign;
$K_a$ represents the static stiffness of the resonator;
$m_a$ represents the mass of the resonator;
$\Omega$ represents the speed of rotation of the rotor and nominal speed in radians per second;
e represents the eccentricity, i.e. a first distance between the drag hinge of the blade and the axis of rotation of the rotor;
$r_a$ represents a second distance between said drag hinge and the center of gravity Cg of the heavy element;
$M_s$ represents the static moment of the blade; and
$I_\delta$ represents the drag inertia of the blade.

In addition, the resilient retaining means 20 advantageously present low dynamic stiffness compared with their static stiffness in order to maximize the oscillations of the weighted element 30 about its equilibrium position in the longitudinal direction D1.

In a first embodiment of the invention, the resilient retaining means comprise a spring.

With reference to FIGS. 1 and 2, in a first variant of this first embodiment, the resilient retaining means 20 comprise a linear spring 21.

Figure 3:
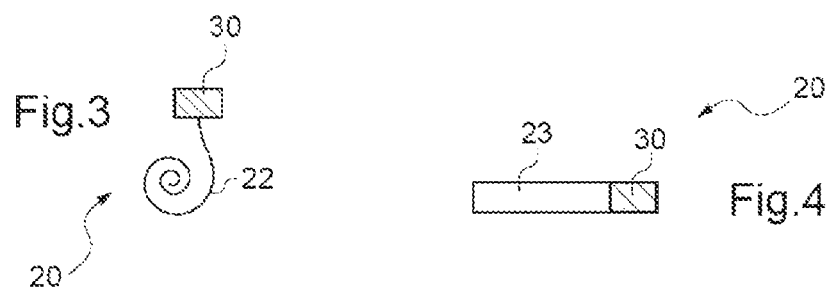
FIG. 3 is a diagrammatic section view of the means for retaining the resonator in a second variant of a first embodiment.

However, in a second variant of this first embodiment, as shown in FIG. 3, the resilient retaining means 20 comprise a torsion spring 22.

Figure 4:
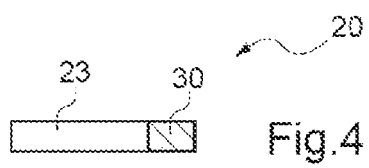
FIG. 4 is a diagrammatic section view of the means for retaining the resonator in a second embodiment.

With reference to FIG. 4, the retaining means 20 include a material 23 having non-linear characteristics and forming part of the group constituted by elastomers.

Figure 5:
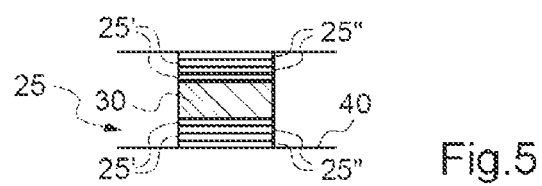
FIG. 5 is a section view representing an optional elastomer bearing of the resonator.

Finally, with reference to FIG. 5, it is possible to envisage fitting the resonator with a laminated bearing 25 in order to obtain the desired static and dynamic stiffnesses. Such a laminated bearing is provided with a succession of metal layers 25' and a succession of elastomer layers 25".

The laminated bearing 25 is then secured to the outer periphery of the weighted element 30 so as to surround it. In addition, the laminated bearing 25 makes contact with the guide means 40.

Naturally, the present invention can be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A blade for a rotorcraft, the blade comprising:
a blade body extending longitudinally from a root to a free end;
a resonator enclosed with the blade body to reduce drag forces on the blade, the resonator including:
a guide channel having opposing completely enclosed ends and being disposed in the blade body and extending in a longitudinal direction of the blade body;
a weighted element disposed in and movable along the guide channel; and
a resilient retaining element securing the weighted element to the blade body, wherein the weighted element is capable of oscillating in the longitudinal direction such that movement of the weighted element reduces drag forces on the blade.

2. The blade according to claim 1, wherein said resilient retaining element has a static stiffness that is greater than a dynamic stiffness.

3. The blade according to claim 1, wherein said resilient retaining element comprises a spring.

4. The blade according to claim 3, wherein said spring is a torsion spring.

5. The blade according to claim 1, wherein said resilient retaining element is formed of an elastomer.

6. The blade according to claim 1, wherein a static stiffness ($K_a$) of the resilient retaining element is substantially equal to twice the product of the mass ($m_a$) of the weighted element multiplied by the angular frequency ($\omega_a$) of a first drag mode of the blade body raised to the power two.

7. The blade according to claim 1, wherein said resonator includes a laminated bearing surrounding said weighted element and coming into contact with said guide channel, said laminated bearing comprising superposed layers of metal material and of elastomer material.

8. The blade according to claim 1, wherein said guide channel comprises a tube embedded in said blade body, said weighted element being arranged inside said tube.

9. The blade according to claim 1, wherein said blade body is a rotorcraft blade.

10. The blade according to claim 1, wherein the resilient retaining element has a static stiffness to prevent the weighted element from contacting an end of the guide channel.

11. The blade according to claim 1, wherein the guide channel is enclosed within the blade body so that the weighted element does not extend beyond the free end of the blade body.

12. A method of reducing drag movements of a blade for a rotorcraft, the blade comprising: a blade body extending longitudinally from a root to a free end; a resonator enclosed with the blade body to reduce drag forces on the blade, the resonator including: a guide channel having opposing completely enclosed ends and being disposed in the blade body and extending in a longitudinal direction of the blade body; a weighted element disposed in and movable along the guide channel; and a resilient retaining element securing the weighted element to the blade body, wherein the weighted element is capable of oscillating in the longitudinal direction such that movement of the weighted element reduces drag forces on the blade, the method comprising:
oscillating the weighted element in the longitudinal direction along the guide channel about an equilibrium position of the blade in order to create secondary Coriolis forces opposing the drag forces of the blade.

13. The method according to claim 12, wherein said blade body is arranged on a hub of a rotor via a drag hinge, method further comprising:
providing a resilient retaining element having a static stiffness $K_a$ determined using the following final relationship:

$$K_a = \frac{2 \times e \times m_a \times \Omega^2 \times (M_s + m_a \times r_a)}{I_\delta + m_a \times r_a^2}$$

where:
× represents the multiplication sign;
$K_a$ represents the static stiffness of the resilient retaining element;

$m_a$ represents the mass of the weighted element;

$\Omega$ represents the speed of rotation of the rotor and nominal speed in radians per second;

e represents the eccentricity, i.e. a first distance between the drag hinge of the blade and the axis of rotation of the rotor;

$r_a$ represents a second distance between said drag hinge and the center of gravity of the heavy element;

$M_S$ represents the static moment of the blade; and $I_\delta$ represents the drag inertia of the blade.

14. A blade for a rotorcraft, the blade comprising:
a blade body adapted to be connected to a hub of a rotor at a first end and having a drag hinge located proximate the first end, the blade body extending longitudinally from the drag hinge to a free end;
a resonator guide channel having opposing completely enclosed ends and being enclosed in the blade body and extending in a longitudinal direction of the blade body;
a resonator weighted element disposed in and movable along the guide channel; and
a resilient retaining element securing the weighted element to the blade body,
wherein the weighted element is adapted to oscillate in the longitudinal direction such that movement of the weighted element counteracts drag forces, and wherein the resilient retaining element has a static stiffness great enough to prevent the weighted element from contacting an end of the guide channel during oscillation.

15. The blade according to claim 14, wherein the static stiffness of the resilient retaining element is greater than a dynamic stiffness.

16. The blade according to claim 14, wherein the resilient retaining element comprises a spring.

17. The blade according to claim 16, wherein the spring comprises one of a torsion spring and a linear spring.

18. The blade according to claim 14, wherein said resilient retaining element is formed of an elastomer that is non-linearly elastic.

19. The blade according to claim 14, wherein the weighted element does not extend beyond the free end of the blade body.

* * * * *